(12) United States Patent
Layachi et al.

(10) Patent No.: US 8,327,108 B2
(45) Date of Patent: Dec. 4, 2012

(54) SLAVE AND A MASTER DEVICE, A SYSTEM INCORPORATING THE DEVICES, AND A METHOD OF OPERATING THE SLAVE DEVICE

(75) Inventors: Daineche Layachi, Le Cannet (FR); Emmanuel Alie, Grasse (FR); Laurent Capella, Vence (FR)

(73) Assignee: ST-Ericsson SA, Geneva (CH)

( * ) Notice: Subject to any disclaimer, the term of this patent is extended or adjusted under 35 U.S.C. 154(b) by 668 days.

(21) Appl. No.: 12/096,165

(22) PCT Filed: Oct. 20, 2006

(86) PCT No.: PCT/IB2006/053879
§ 371 (c)(1),
(2), (4) Date: Dec. 5, 2009

(87) PCT Pub. No.: WO2007/049211
PCT Pub. Date: May 3, 2007

(65) Prior Publication Data
US 2010/0070719 A1    Mar. 18, 2010

(30) Foreign Application Priority Data
Oct. 28, 2005    (EP) .................................. 05300878

(51) Int. Cl.
*G06F 12/00* (2006.01)
*G06F 13/40* (2006.01)

(52) U.S. Cl. ...................................... 711/171; 710/307

(58) Field of Classification Search .................. 710/307; 711/171; 712/300
See application file for complete search history.

(56) References Cited

U.S. PATENT DOCUMENTS

| 5,524,256 | A | * | 6/1996 | Turkowski | 712/300 |
| 6,157,818 | A | * | 12/2000 | Rode | 455/88 |
| 6,275,519 | B1 | * | 8/2001 | Hendrickson | 375/138 |
| 6,687,262 | B1 |  | 2/2004 | Jin et al. |  |
| 7,127,595 | B1 | * | 10/2006 | Gou | 712/300 |

FOREIGN PATENT DOCUMENTS
EP    0817003 A2    1/1998
WO   WO97/14101 A    4/1997

* cited by examiner

*Primary Examiner* — Yaima Campos
*Assistant Examiner* — Mehdi Namazi
(74) *Attorney, Agent, or Firm* — William J. Kubida; Peter J. Meza; Hogan Lovells US LLP

(57) ABSTRACT

An electronic slave device includes a hardware data packing block having a configurable multiplexing unit having inputs connected to system bus, wires for receiving in parallel each bit of a data word, outputs connected to the respective data write pins of a memory for outputting in parallel each bit of a rearranged data word to be recorded, and rearrangeable connections between the inputs and the outputs according to a set configuration; a format register, the value of which can be set by an external master device to at least two different values; and a logic circuit capable of setting the connections of the multiplexing unit according to the value of the format register to obtain a rearranged data word having at least one symbol with a shifted position in comparison with the position of this symbol in the received data word.

8 Claims, 3 Drawing Sheets

SLAVE AND A MASTER DEVICE, A SYSTEM INCORPORATING THE DEVICES, AND A METHOD OF OPERATING THE SLAVE DEVICE

FIELD OF THE INVENTION

The present invention relates to a slave and a master device, a system incorporating the devices, and a method of operating the slave device.

BACKGROUND OF THE INVENTION

There exist electronic slave devices that receive P-bit-wide symbols transmitted from an external electronic master device, X symbols being placed within an N-bit-wide data word which is transmitted in one go from the master device to the slave device via a system bus.

These slave devices have writable memory for storing the symbols locally before they are processed.

Data word packing is often necessary to suit the characteristics of the slave device memory.

For example, if symbols generated by the master device are coded in 4 bits and sent one at a time in a 32-bit-wide data word, a transport format may define that the 4 bits of the symbol occupy the four least significant bits (LSB) of the data word whereas the other 28 bits of the data word are of no interest to this slave device.

The transport format defines the position of each symbol within a data word.

If the slave device memory is a 32-bit-wide memory and the received data word is recorded in the memory as it is received, 28 bits out of 32 bits of each memory row are wasted. To avoid such a waste, data packing should be done before recording symbols in the memory. In the above example, data packing may consist of gathering, into a single rearranged data word, the symbols received in eight data words. Then, only the rearranged data word is recorded in the slave device memory to save memory space.

Data packing is done by a data packing block. The data packing block may be implemented by software in the master device or in the slave device. However, such a software implementation of the data packing block consumes many CPU (Computing Processing Unit) clock cycles.

The data packing block may also be implemented by hardware. The data packing is then faster than with a software implementation. However, hardware data packing blocks are suited only to one specific transport format. As a result, a slave device incorporating such a hardware data packing block is not very flexible because it can only be used with one predetermined data word transport format.

SUMMARY OF THE INVENTION

Accordingly, it is an object of the invention to provide a slave device which is more flexible.

With the foregoing and other objects in view, there is provided, in accordance with the invention, an electronic slave device for receiving P-bit-wide symbols transmitted from an external master device, x symbols being placed within an N-bit-wide data word which is transmitted in one go from the master device to the slave device via a system bus, this slave device comprising:
  a writable memory;
  a hardware data packing block;
wherein the hardware data packing block comprises:
  a configurable multiplexing unit having inputs connected to system bus wires for receiving in parallel each bit of the data word, outputs connected to the respective data write pins of the memory for outputting in parallel each bit of a rearranged data word to be recorded, and rearrangeable connections between the inputs and the outputs according to a set configuration;
  a format register, the value of which can be set by the external master device to at least two different values; and
  a logic circuit capable of setting the connections of the multiplexing unit according to the value of the format register to obtain a rearranged data word having at least one symbol with a shifted position in comparison with the position of this symbol in the received data word.

The above slave device can be adapted to at least two different transport formats by setting the appropriate value in the format register. Thus, the slave device is more flexible. Furthermore, the slave device is faster than any software data packing block implementation because this is a hardware implementation. More precisely, the hardware data packing block does not use a CPU that needs to load instructions before executing them and is therefore faster.

The embodiment of the above slave device may comprise one or more of the following features:
  the writable memory is a bit-addressable memory having K-bit-wide addressable rows, each row being divided into a plurality of P-bit-wide cells, K being a positive integer, and the logic circuit is able to set the connection of the multiplexing unit for each received data word to:
  record the x symbols placed within a first received data word in P-bit-wide cells of the memory so that at least one free P-bit-wide cell remains on one of the addressable rows used to record these symbols; and
  record at least one of the symbols placed within a second data word in the free cell of the addressable row previously used to record symbols of the first data word in order to complete this row.
  the hardware data packing block is designed to record each symbol in each addressable row according to a predetermined order in which the symbols are transmitted from the master device to the slave device.

The above embodiments of the slave device have the following advantages:
  recording symbols placed within a second data word to complete a slave device memory row saves memory space;
  recording symbols in the order in which the symbols are transmitted from the master device to the slave device facilitates the retrieving of the recorded symbols.

The invention also relates to a master device for transmitting P-bit-wide symbols to the above slave device, the master device being able to set the format register value of the slave device.

The invention also relates to a system for transmitting P-bit-wide symbols from an external master device to the above slave device, wherein the system comprises:
  the master device;
  the slave device; and
  the system bus.

The invention also relates to a method of operating the above slave device, wherein the method comprises the step of setting the connections of the multiplexing unit according to the value of the format register to obtain a rearranged data word having at least one symbol with a shifted position in comparison with the position of this symbol in the received data word.

The embodiments of the above method may comprise the following features:

a first recording step during which the X symbols placed within a first received data word are recorded in P-bit-wide cells of the memory so that at least one free P-bit-wide cell remains on one of the addressable rows used to record these symbols, and a second recording step during which at least one of the symbols placed within a second received data word is recorded in the free cell of the addressable row previously used to record symbols of the first data word in order to complete this row; and during the first and second recording steps, the symbols in each addressable row are recorded according to a predetermined order in which the symbols are transmitted from the master device to the slave device.

These and other aspects of the invention will be apparent from the following description, drawings and claims.

DESCRIPTION OF THE PREFERRED EMBODIMENTS

Figure 1:
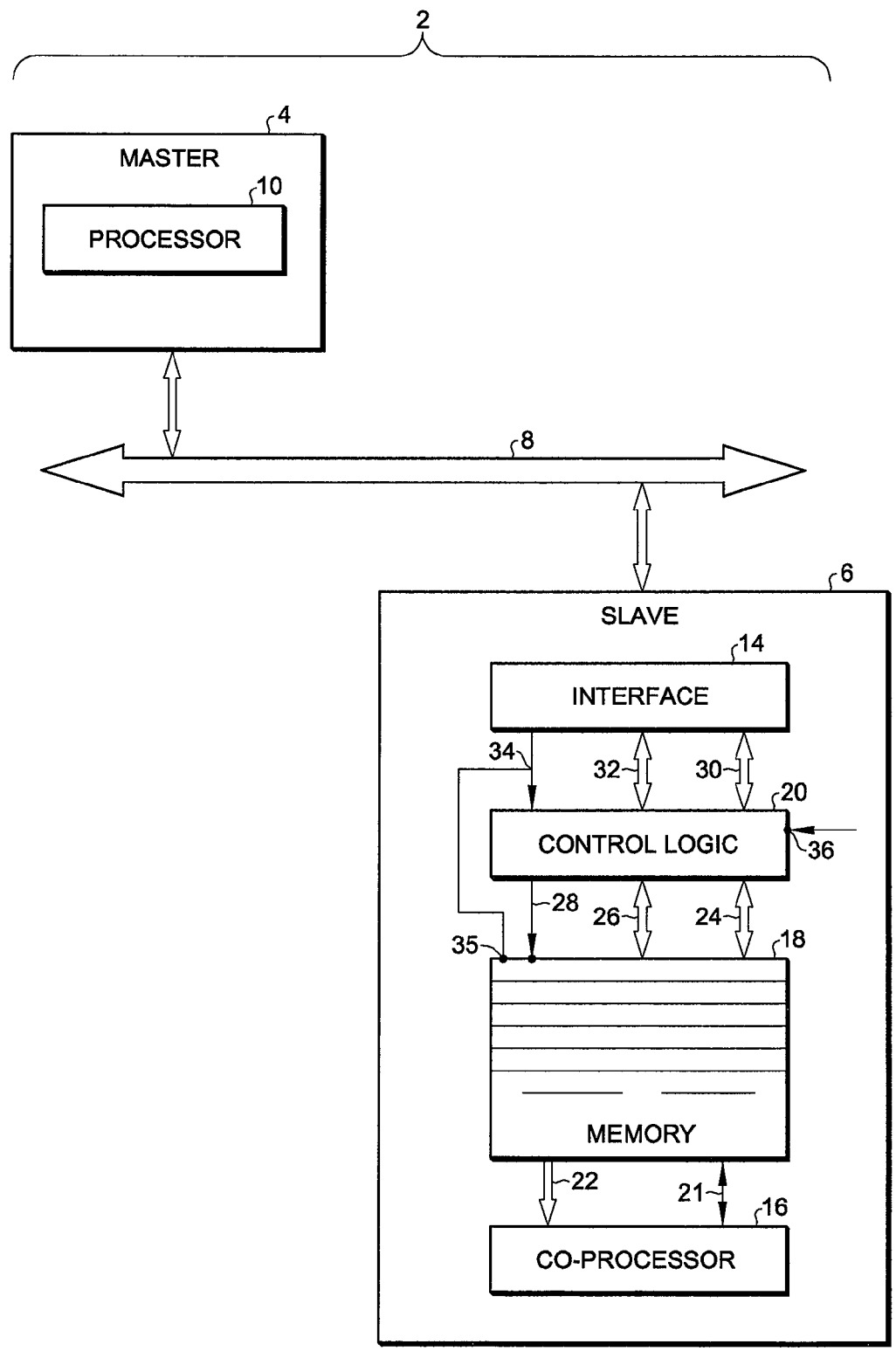
FIG. 1 is a schematic diagram of a system for transmitting P-bit-wide symbols from a master device to a slave device.

FIG. 1 shows a system 2 for transmitting P-bit-wide symbols from a master device 4 to a slave device 6 via a system bus 8.

For example, the device 4 has a processor 10 for executing a software application. The device 4 may be a CPU (Central Processing Unit). The processor 10 may implement a DMA (Direct Memory Access) module. The device 4 is connected to the bus 8.

Typically, the bus 8 is the system bus of a printed circuit board. The bus 8 is an N-bit-wide bus formed of N parallel wires, each wire being set to a logic state according to the bits of an N-bit-wide data word to be transmitted. For example, each wire may be driven to a high level corresponding to a logic one and to a low level corresponding to a logic zero.

For example, N is an integer greater than eight. Here N is equal to thirty-two.

Preferably, the bus 8 complies with a bus standard such as PCI (Peripheral Component Interconnect), AHB (Advanced High-Performance Bus) or APB (Advanced Peripheral Bus).

The device 6 is connected to the bus 8 to receive symbols generated by the master device 4 and to process these symbols. For example, the slave device 6 is an MPEG (Moving Picture Expert Group) decoder or a Viterbi decoder.

The device 6 has a system bus interface 14 to interface the device 6 to the bus 8.

The device 6 also has:

a co-processor unit 16 such as a DSP (Digital Signal Processor) to perform decoding operations such as MPEG decoding or Viterbi decoding;

a bit-addressable memory 18 to locally store symbols transmitted by the device 4 before they are processed by the unit 16;

a hardware data packing block 20 connected between the interface 14 and memory 18 to perform data packing on the received data word to save memory space.

The unit 16 is connected to the memory 18 through a memory control bus 21 and a data bus 22 to retrieve the symbols stored in the memory 18.

The block 20 is connected to the memory 18 through an address bus 24, a k-bit-wide data write bus 26 and a k-bit-wide selection bus 28.

The memory 18 has M addressable memory rows, each memory row being k bits wide. Any bit of any memory row can be written independently. This is known as the bit write enable capability.

Preferably, k is an integer greater than or equal to 32. However, for illustration purposes, k is equal to 32 here.

The bus 24 is used to select the memory row where the data word on the bus 26 should be written. The bus 28 is used to select the bits of the selected row that have to be written.

The block 20 is also directly connected to the interface 14 via an address bus 30, a data N-bit-wide write bus 32 and a write enable bus 34. The write enable bus 34 is also connected to a bit write enable input 35 of the memory 18.

The bus 32 is used to transmit the received data word to the block 20.

The bus 30 is used to indicate the memory row address where the data word has to be written.

The buses 26, 28, 32 comprise k parallel wires, each wire being driven to a logical state according to the data word to be transmitted.

The block 20 has a transport format input 36 which is intended to receive a transport format value set by the device 4.

For example, the transport format value is a number that specifies a pre-defined transport format.

For illustration purposes, the following table presents the transport format definition associated with transport format values from 0 to 9 in the particular case where each symbol is coded in four bits.

TABLE

| | data transport format | | | |
|---|---|---|---|---|
| Transport format | Data occupation in a 32-bit-wide data word (each cell represents 4 bits) | | | |
| value | Byte 3 | Byte 2 | Byte 1 | Byte 0 |
| | Symbol position LSB → MSB | | | |
| 0 | $S_3$ | $S_2$ | $S_1$ | $S_0$ |
| 1 | $S_7$ $S_6$ | $S_5$ $S_4$ | $S_3$ $S_2$ | $S_1$ $S_0$ |
| 2 | | | | $S_0$ |
| 3 | | | $S_1$ | $S_0$ |
| 4 | | | $S_1$ | $S_0$ |
| | Symbol position MSB → LSB | | | |
| 5 | $S_0$ | $S_1$ | $S_2$ | $S_3$ |
| 6 | $S_0$ $S_1$ | $S_2$ $S_3$ | $S_4$ $S_5$ | $S_6$ $S_7$ |
| 7 | $S_0$ | $S_2$ | $S_3$ | $S_4$ |
| 8 | | | $S_0$ | $S_1$ |
| 9 | | | $S_0$ | $S_1$ |

In the above table, the first cell of each row contains the transport format value. The following cells represent 4-bit cells of the data word.

Empty 4-bit cells represent unused bits on the system bus. On the contrary, 4-bit cells containing a symbol $S_i$ represent bits used on the system bus 8. Index i is the order number of symbol $S_i$. For example, $S_0$ is the first symbol generated by device 4, $S_1$ is the following one and so on.

In the first five transport formats defined in the table, the symbols $S_i$ are classified from least significant bit (LSB) to most significant bit (MSB). In the last five transport formats in the table, the symbols $S_i$ are classified from MSB to LSB.

According to the table, ten different transport formats are available to the device 4 for transmitting a data word to the device 6. Of course, the table can be supplemented with many additional or different transport formats.

The block 20 will be described in more detail with reference to FIG. 2.

Figure 2:
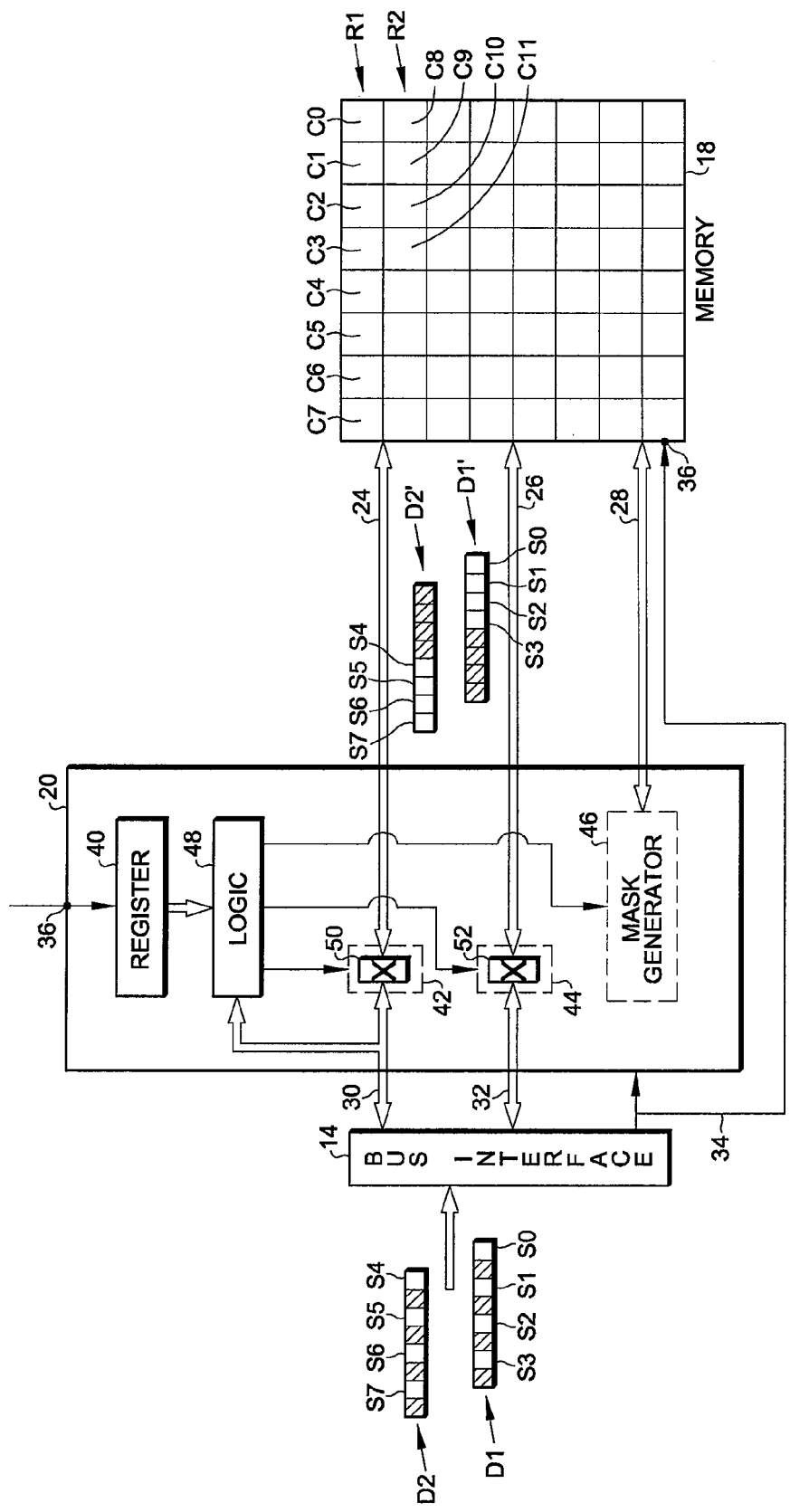
FIG. 2 is a schematic diagram of a hardware data packing block used in the system of FIG. 1.

In FIG. 2 the elements already described in FIG. 1 have the same references.

The block 20 has a format register 40 for storing the transport format value set by the device 4. The register 40 is connected to the input 36.

The block 20 also comprises:
- a controllable address reformatting unit 42 for setting the address on the bus 24;
- a configurable multiplexing unit 44 capable of shifting the symbol position within a received data word and outputting on the bus 26 the corresponding rearranged data word;
- a mask generator 46 for sending a masking value BSEL on the bus 28; and
- a control logic circuit 48 for controlling and commanding the units 42 and 44 and the generator 46.

The unit 42 builds an address according to the address on the bus 30 and to the instruction from the circuit 48. For example, the unit 42 has a configurable multiplexer 50 to shift the bit position in the address received via the bus 30 and to output the rearranged address on the bus 24.

The multiplexing unit 44 has inputs connected to respective wires of the bus 32 and outputs connected to respective wires of the bus 26. The unit 44 is able to rearrange the connection between its inputs and outputs according to a set configuration to obtain a rearranged data word having symbols with a shifted position in comparison with the position of these symbols in the data word received via the bus 32. For example, the unit 44 has a configurable multiplexer 52 that connects inputs to outputs according to the set configuration.

The generator 46 generates the masking value BSEL according to an instruction from the logic circuit 48. The masking value BSEL is a 32-bit-wide value. Bits at high level in the masking value indicate the position of the memory row bits to be written.

The logic circuit 48 controls the units 42 and 44 and the generator 46 according to the transport format value stored in the register 40 and to the least significant bits of the bus 30. More precisely, the transport format value is used by the circuit 48 to determine the symbol $S_i$ position within the received data word. The least significant bits of the bus 30 are used by the circuit 48 to determine the bit positions within a memory row where received symbols should be recorded. The least significant bits are also used by the circuit 48 to determine the address of the memory row where symbols are to be recorded.

For example, the circuit 48 is built from logic components like AND gates, OR gates, NOR gates and so on.

In FIG. 2, two memory rows $R_1$ and $R_2$ are shown. Each memory row is divided into P-bit-wide memory cells. For example, row $R_1$ is divided into cells $C_0$ to $C_7$ from right to left.

FIG. 2 also illustrates two data words $D_1$ and $D_2$ built according to the transport format corresponding to the transport format value 0. Data word $D_1$ is transmitted by the device 4 before data word $D_2$.

Data word $D_1$ has four symbols $S_0$ to $S_3$ and data word $D_2$ has the following four symbols $S_4$ to $S_7$.

Hatched cells in data words $D_1$ and $D_2$ are unused P-bit cells.

FIG. 2 also illustrates two rearranged data words $D'_1$ and $D'_2$ corresponding respectively to data words $D_1$ and $D_2$.

Data word $D'_1$ has the four symbols $S_0$ to $S_3$ that are successively placed in the 16 least significant bits from right to left.

Data word $D'_2$ has the four symbols $S_4$ to $S_7$ that are successively placed in the 16 most significant bits from right to left.

Figure 3:
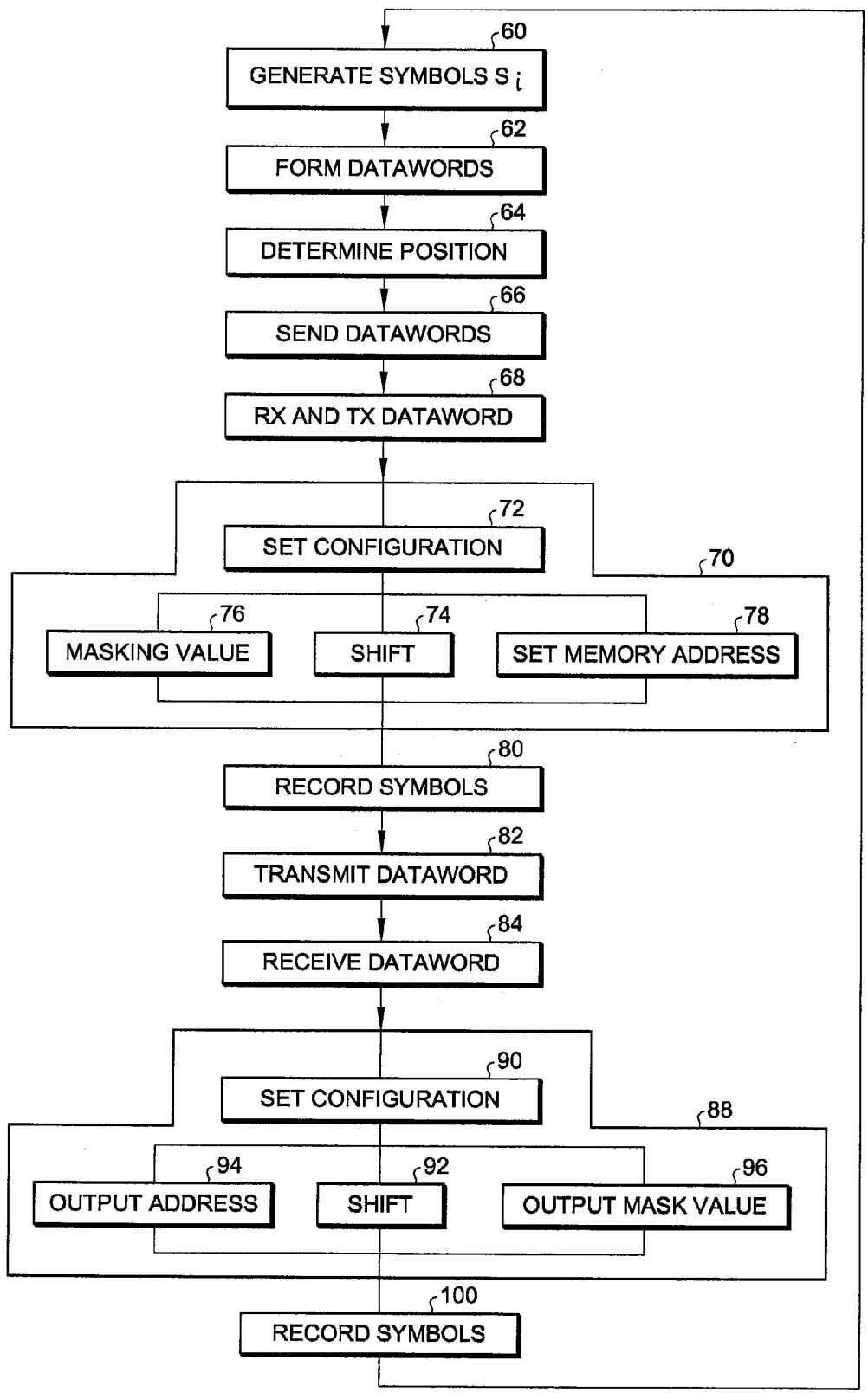
FIG. 3 is a flowchart of a method of operating the slave device of the system of FIG. 1.

The operation of the system 2 will now be described with reference to FIG. 3 in the particular case of the transmission of data words $D_1$ and $D_2$.

Initially, in step 60, the processor 10 executes software that generates consecutive symbols $S_i$.

Then, in step 62, the processor 10 packs the generated symbols and, possibly, other data in data words according to the transport format corresponding to transport format value zero. For example, the other data which are not intended for the device 6 are transmitted via the bus 8 using the unused bits represented by empty cells in the table of each data word.

In step 64, the device 4 provides the device 6 with the position of each symbol $S_i$ within each data word before transmitting these data words. More precisely, the device 4 sets the value of the format register 40 to zero.

Subsequently, in step 66, the device 4 sends data word $D_1$ containing symbols $S_0$ to $S_3$.

In step 68, the interface 14 receives data word $D_1$ and transmits data word $D_1$ to the block 20 via the bus 32. The interface 14 also transmits the address where data word $D_1$ is to be recorded to the block 20 via the bus 30.

In step 70, the block 20 shifts the positions of symbols $S_0$ to $S_3$ to obtain data word $D'_1$ from data word $D_1$ according to the value of the format register 40.

More precisely, during operation 72, the circuit 48 sets the configuration of the units 42 and 44 and the generator 46 according to the transport format value and the value of the address on the bus 30.

Thereafter, in operation 74, the unit 44 shifts the positions of symbols $S_0$ to $S_3$ to obtain data word $D'_1$ from data word $D_1$. Here, for example, symbols $S_1$ to $S_3$ are shifted to the right so that symbols $S_0$ to $S_3$ occupy all least significant bits of the 32-bit-wide rearranged data word $D_1'$.

In parallel, during operation 76, the generator 46 is controlled by the circuit 48 to output on the bus 28 the following masking value: 0x0000FFFF in hexadecimal.

Also in parallel, during operation 78, the unit 42 sets a memory address on the bus 24 corresponding to a free memory row. Here, the memory row address corresponds to row $R_1$.

Operations 72 to 78 are performed in one clock cycle of the system bus 8.

In the following clock cycle of the bus 8, a write enable signal of the bus 34 is set to high level. In response to this high level on the input 36, in step 80, the memory 18 records symbols $S_0$ to $S_3$ in cells $C_0$ to $C_3$ of row $R_1$.

Thereafter, in step 82 the device 4 transmits the following data word $D_2$ containing the following symbols $S_4$ to $S_7$. For example, step 82 is identical to the succession of steps 62, 64 and 66.

Then, in step 84, the interface 14 receives data word $D_2$. For example step 84 is identical to step 68.

Thereafter, in step 88, the block 20 shifts the positions of symbols $S_4$ to $S_7$ to obtain data word $D_2'$ from data word $D_2$.

More precisely, during operation 90, the circuit 84 sets the configuration of the units 42 and 44 and the generator 46 according to the value of the format register 40 and the value of the address on the bus 30. For example, the circuit 48 configures the unit 44 to shift symbols $S_4$ to $S_7$ to the left so that symbols $S_4$ to $S_7$ occupy the most significant bits of data word $D_2'$.

The circuit 48 also configures the unit 42 so that the address on the bus 24 is equal to the address of row R1, and the control generator 46 so that this generator outputs a masking value equal to 0xFFFF0000.

During operation 92, the multiplexing unit 44 shifts the symbol positions to obtain data word $D_2'$ according to the set configuration.

In parallel, during operation 94, the unit 42 outputs the address of row $R_1$.

Also in parallel, during operation 96, the generator 46 outputs the masking value 0xFFFF0000.

As previously, operations 90 to 96 are performed during one clock cycle of the bus 8.

In the following clock cycle, the write enable signal is set to high level and, in step 100, symbols $S_4$ to $S_7$ are recorded in cells $C_4$ to $C_7$ of row $R_1$, respectively.

After step 100, the method returns to step 60 to transmit and record the following data word in a similar way.

Many additional embodiments are possible. For example, the value of the format register specifies the symbol positions within each data row rather than a pre-recorded format definition. In such an embodiment, for example, the format transport value is an N-bit-wide value and each bit at a high level indicates the position of a bit of a symbol $S_i$.

The logic circuit or part of the logic circuit may be incorporated within the multiplexing unit, the address reformatting unit and the mask generator.

If desirable, it is not necessary to record symbols $S_i$ in the same order as the one in which the symbols are transmitted to the device 6. For example, data word $D_1$ is not rearranged before being recorded in row $R_1$ and only data word $D_2$ is rearranged so that symbols $S_4$, $S_5$, $S_6$ and $S_7$ are recorded in the free cells of row $R_1$.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of electronic devices and the art of communication via a bus and which may be used instead of or in addition to features already described herein.

The invention claimed is:

1. An electronic slave device to receive P-bit width symbols transmitted from an external master device X symbols being placed within a N-bit width dataword which is transmitted all at once from the master device to the slave device through a system bus, the slave device comprising:
   a writeable memory,
   a hardware data packing block comprising a configurable multiplexing unit having inputs connected to the system bus wires to receive in parallel each bit of the dataword, outputs connected to the respective data write pins of the memory to output in parallel each bit of a rearranged dataword to be recorded, and rearrangeable connections between the inputs and the outputs according to a set configuration,
   a format register for storing a transport format value, the value of which can be set by the external master device to at least two different values, and
   a logic circuit capable of setting the connections of the multiplexing unit according to the value of the format register to obtain a rearranged dataword having at least two symbols with at least one symbol with a shifted position by comparison to the position of this symbol in the received dataword, said rearranged dataword having a data occupation that is defined by said transport format value.

2. The slave device according to claim 1, wherein the writeable memory is a bit addressable memory having K-bit width addressable rows, each row being divided into a plurality of P-bit width cells, K being a positive integer, and wherein the logic circuit is able to set the connection of the multiplexing unit for each received dataword to:
   record the X symbols placed within a first received dataword in P-bit width cells of the memory so that at least one free P-bit width cell remains on one of the addressable row used to record these symbols, and
   record at least one of the symbols placed within a second dataword in the free cell of the addressable row previously used to record symbols of the first dataword in order to complete this row.

3. The slave device according to claim 2, wherein the hardware data packing block is designed to record each symbol in each addressable row according to a predetermined order in which the symbols are transmitted from the master device to the slave device.

4. A master device to transmit P-bit width symbols to a slave device according to claim 1, X symbols being placed within a N-bit width dataword which is transmitted all at once from the master device to the slave device through a system bus, wherein the master device is able to set the format register value of the slave device.

5. A system to transmit P-bit width symbols from an external master device to a slave device, X symbol being placed within a N-bit width dataword which is transmitted all at once from the master device to the slave device through a system bus, the system comprising:
   the master device,
   the slave device, and
   the system bus,
wherein the slave device comprises the electronic slave device of claim 1.

6. A method to operate a slave device according to claim 1, wherein the method comprises the step of setting the connections of the multiplexing unit according to the value of the format register to obtain a rearranged dataword having at least one symbol with a shifted position by comparison of the position of this symbol in the received dataword.

7. A method according to claim 6, wherein the method comprises:
   a first recording step during which the X symbols placed within the first received dataword are recorded in a P-bit width cells of the memory so that at least one free P-bit width cell remains on one of the addressable row used to record these symbols, and
   a second recording step during which at least one of the symbols placed within a second received dataword is recorded in the free cell of the addressable row previously used to record symbols of the first dataword in order to complete this row.

8. The method according to claim 7, wherein during the first and second recording steps, the symbols in each addressable row are recording according to a predetermined order in which the symbols are transmitted from the master device to the slave device.

* * * * *